United States Patent
Crawford

(10) Patent No.: US 8,111,776 B1
(45) Date of Patent: Feb. 7, 2012

(54) PULSE INSERTION SYSTEMS AND METHODS FOR POLAR MODULATION

(75) Inventor: James A. Crawford, San Diego, CA (US)

(73) Assignee: Quintic Holdings, Santa Clara, CA (US)

( * ) Notice: Subject to any disclaimer, the term of this patent is extended or adjusted under 35 U.S.C. 154(b) by 940 days.

(21) Appl. No.: 12/119,279

(22) Filed: May 12, 2008

Related U.S. Application Data

(63) Continuation of application No. 11/971,790, filed on Jan. 9, 2008, now abandoned.

(60) Provisional application No. 60/884,164, filed on Jan. 9, 2007.

(51) Int. Cl.
*H04L 27/00* (2006.01)
(52) U.S. Cl. ........................ 375/295; 375/296
(58) Field of Classification Search .................. 375/295, 375/296
See application file for complete search history.

(56) References Cited

U.S. PATENT DOCUMENTS

| | | | | |
|---|---|---|---|---|
| 2006/0227895 | A1* | 10/2006 | Booth et al. | 375/296 |
| 2008/0007346 | A1* | 1/2008 | Jensen et al. | 331/16 |

* cited by examiner

*Primary Examiner* — Kenneth Lam
*Assistant Examiner* — Michael Neff
(74) *Attorney, Agent, or Firm* — Blairtech Solution LLC

(57) ABSTRACT

Systems and methods for bandwidth reduction in polar modulation systems are described. Detection of problematic signal transition paths may performed, and then, dependent on the signal path, a correction signal may be generated and added to the signal to improve system performance. In typical implementations, detection of problematic signal paths may be performed by determining whether the signal transitions through a particular region in the signal constellation, such as a region about the origin, or whether the signal instantaneous frequency exceeds a predetermined threshold, and then responsively generating the correction signal.

13 Claims, 12 Drawing Sheets

700

800

US 8,111,776 B1

PULSE INSERTION SYSTEMS AND METHODS FOR POLAR MODULATION

CROSS-REFERENCE TO RELATED APPLICATIONS

This application is a continuation application under 37 C.F.R. §1.53(b) of patent application Ser. No. 11/971,790 filed on Jan. 9, 2008, now abandoned entitled PULSE INSERTION SYSTEMS AND METHODS FOR POLAR MODULATION. This application also claims the benefit of priority under 35 U.S.C. §119(e) to United States Patent Application U.S. Provisional Patent Application Ser. No. 60/884,164, entitled PULSE INSERTION SYSTEMS AND METHODS FOR POLAR MODULATION, filed on Jan. 9, 2007, the contents of which is hereby incorporated by reference herein in its entirety for all purposes.

FIELD OF THE INVENTION

The present invention relates generally to wireless communication systems that employ polar modulation methods to transmit non-constant envelope signaling waveforms. More particularly but not exclusively, the present invention relates to systems and methods for bandwidth reduction through pulse insertion.

BACKGROUND

Signal modulation has historically been impressed on an intermediate frequency (IF) or radio frequency (RF) carrier by using a rectangular coordinate system. The rectangular coordinates are normally referred to as the in-phase (I) and quadrature-phase (Q) components. The I-channel is used to directly modulate a cosine-carrier signal and the Q-channel is used to directly modulate a sine-carrier signal. The modulated carriers are then summed and amplified to form the desired transmit signal. This approach is very general and can in principle be used to create any transmit waveform of interest. It is hereinafter referred to as IQ modulation in this disclosure.

Polar modulation is an alternative modulation method which is mathematically identical to IQ modulation. Polar modulation is capable of exhibiting much better power amplifier efficiency than IQ modulation and is of great interest in the low-power communications industry for that reason.

Modern communication systems make substantial use of digital signal processing methods. The I- and Q-channel modulation signals are normally represented by a series of synchronous discrete time samples that can be represented by the sample pairs ($I_k$, $Q_k$). The equivalent polar representation of this same signal is given by $R_k \angle \theta_k$, in which $R_k$ is the magnitude of the signal modulation and $\theta_k$ is the phase of the modulation. Mathematically, the IQ modulation and polar modulation coordinate samples are related by:

$$R_k = \sqrt{I_k^2 + Q_k^2}$$

$$\theta_k = \tan^{-1}(Q_k, I_k) \quad (1)$$

and $$I_k = R_k \cos(\theta_k)$$

$$Q_k = R_k \sin(\theta_k) \quad (2)$$

One of the most severe problems associated with polar modulation is that the signal bandwidth of the polar modulation is normally much larger than the bandwidth of the IQ modulation system. This is especially true for the phase component. Although the mathematical relationships given by (1) and (2) are exact, they are also highly nonlinear, leading to severe bandwidth expansion in application. A bandwidth-limited IQ modulation signal does not in general create a bandwidth-limited polar signal.

One of the major causes of this problem is modulation signal trajectories that pass near the origin of the signal constellation. Such signal trajectories can produce severe spiking behavior in the phase channel, resulting in severe bandwidth expansion. In order for systems to effectively employ polar modulation and exploit its benefits in the power amplifier area, bandwidth reduction of the polar modulation waveforms is very desirable if it can be accomplished without causing other serious impairments to system performance.

SUMMARY

Methods and systems for modifying polar modulation signals to improve performance and reduce bandwidth demands for associated signal processing are disclosed. These methods and associated systems are also denoted herein as the STM method or STM approach for purposes of brevity. In accordance with aspects of the invention, problematic signal trajectories may be detected and corrective signals may be inserted to improve performance by modifying the signal trajectories.

Embodiments of the present invention may allow for tradeoff of major transmit system performance parameters of polar modulation including signal bandwidth, signal fidelity in the form of Error Vector Magnitude (EVM), and adjacent channel leakage ratio (ACLR), to achieve a wide range of performance characteristics.

BRIEF DESCRIPTION OF THE DRAWINGS

The foregoing aspects and the attendant advantages of the embodiments described herein will become more readily apparent by reference to the following detailed description when taken in conjunction with the accompanying drawings wherein.

DETAILED DESCRIPTION

The methods and systems disclosed herein are applicable to any digital communication system that employs polar modulation or derivatives thereof to communicate digital communication waveforms. These waveforms may be generally described mathematically as a superposition of pulse-like waveforms such as for EDGE and WCDMA (see, e.g. Proakis, J. G., Digital Communications, $4^{th}$ Ed., McGraw-Hill Book Co., 2001, "Digital Cellular Telecommunications System (Phase 2+) Modulation," ETSI TS 100 959 V8.4.0 (2001-11), and "$3^{rd}$ Generation Partnership Project; Technical Specification Group Radio Access Network; User Equipment (UE) Radio Transmission and Reception (FDD)," 3GPP TS 25.101 V6.7.0(2005-03).

The balance of this disclosure will address WCDMA applications, but it will be apparent to those of skill in the art that the techniques employed herein are applicable to a variety of other systems and applications and therefore are not intended to be limited merely to WCDMA applications.

Embodiments of the Signal Trajectory Modification (STM) methods and systems described herein (also denoted herein for brevity as the STM approach or S™ method) and in related U.S. Provisional Patent Application Ser. No. 60/884, 164, incorporated by reference herein in its entirety, may be used to augment the normal IQ-based transmit signal with an additive bandlimited signal such that the bandwidth and precision demands of the augmented signal represented in polar form may be dramatically reduced. Although in some embodiments the addition of this bandlimited signal may cause some degradation to the transmit EVM, any degradations may be more than offset by potentially significant benefits such as improved adjacent channel leakage rejection (ACLR), reduced requirements for digital to analog converter (DAC) clock rates and bit-widths, and ultimately lower power consumption.

Figure 1:
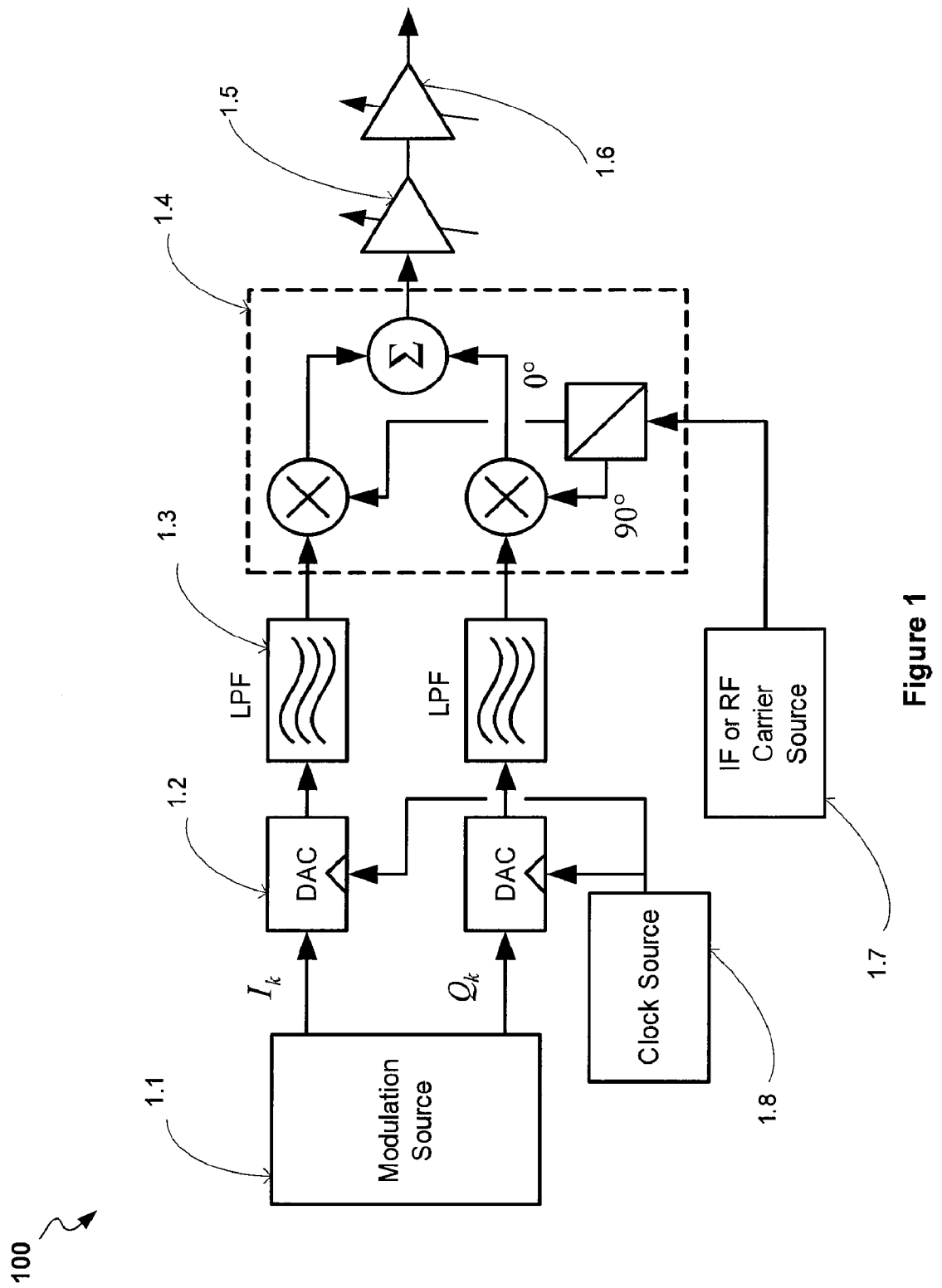
FIG. 1 illustrates a typical traditional IQ modulator using direct modulation.

Attention is now directed to FIG. 1, which illustrates a traditional IQ direct modulation approach for producing a modulated signal. This traditional approach can be used to create a fairly arbitrary transmit signal. A digital modulation source (1.1) may be used to create signal sample pairs ($I_k, Q_k$) that are converted to analog voltages or currents using DACs (1.2). The DACs are clocked by a precision synchronous reference source (1.8). The DAC outputs are then followed by analog lowpass filters (1.3) that perform anti-aliasing filtering. The filter outputs are then provided to an IQ modulator (1.4). An IF or RF carrier signal source (1.7) is also provided to the IQ modulator and the resultant modulated carrier signal is provided to a variable gain amplifier (VGA) (1.5). Additional gain control or amplification may then be provided by a second VGA or a power amplifier (PA) (1.6) if desired.

This direct modulation approach relies on linear gain modules throughout, which results in substantial inefficiency in power amplifier (PA) sections because the output power from the PA must always be maintained well below the PA's maximum output power capability in order to have sufficiently good linearity.

Figure 2:
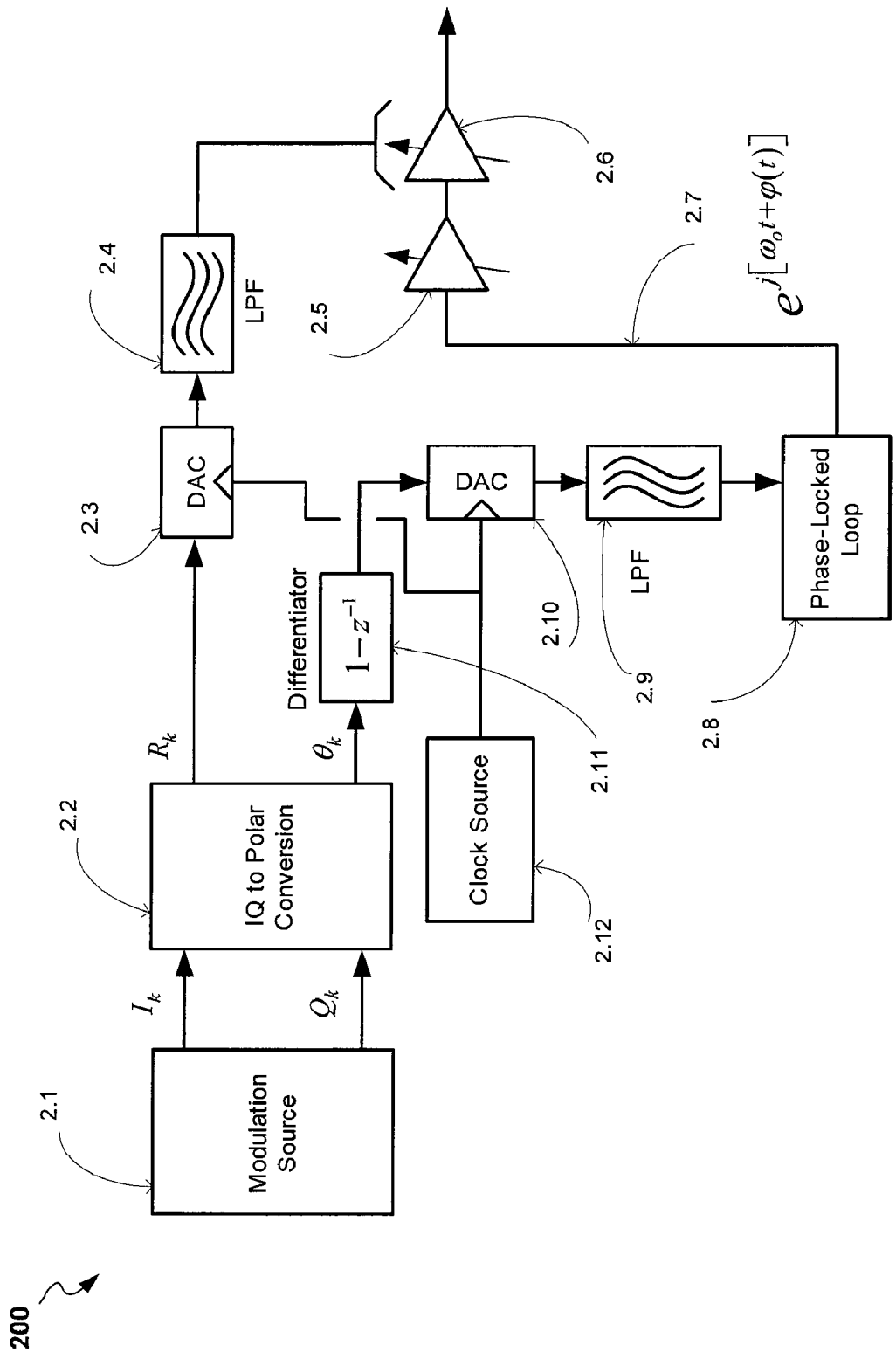
FIG. 2 illustrates a typical implementation of polar modulation using a modulated phase-locked loop (PLL) to create the phase portion of the modulation.

As an alternate to direct modulation, polar modulation may be used. FIG. 2 shows a typical polar modulation system based on a phase locked loop (PLL) to which the teachings of the present invention may be applied. While the illustrations provided herein describe certain embodiments of the present invention with respect to a PLL implementation, it will be appreciated by those of skill in the art that the STM methods and systems as described herein may be applied to all polar methods regardless of implementation. This is because the STM approach may be used to modify the original ($I_k, Q_k$) sample pairs before any IQ to polar conversion takes place. For example, in some embodiments the STM approach may be implemented on the IQ signals between blocks (2.1) and (2.2), as shown in FIG. 2, before any IQ to polar conversion processing is done.

In some embodiments source (2.1) can be identical to source (1.1) in FIG. 1. However, in some embodiments it may be desirable for the ($I_k, Q_k$) sample streams to be up-sampled to a higher sampling rate for the polar modulation method than for the IQ modulation method due to the bandwidth expansion that may occur when the IQ to polar conversion is done by (2.2). Failure to do adequate up-sampling may impact signal fidelity because the Nyquist criterion will be violated. Interpolation (i.e., filtering) ($I_k, Q_k$) samples is not equivalent to interpolating ($R_k, \theta_k$) samples.

The amplitude and phase corresponding to each output sample pair $R_k \angle \theta_k$ can be related to the input ($I_k, Q_k$) sample pair by equations (1) and (2). The $R_k$ samples may be handled fairly simply, as illustrated in the embodiment shown in FIG. 2, by first converting them to voltage/current using DAC (2.3) and then applying the output to an anti-aliasing analog filter (2.4) followed by application to the final VGA or PA (2.6).

In a PLL-based polar implementation, the phase processing path can be considerably more complicated than the amplitude path. Ultimately, the phase modulation may be imposed on a voltage-controlled oscillator (VCO) within the PLL (2.8) as frequency modulation (FM). In order to interface correctly with the VCO, the phase samples $\theta_k$ may be differentiated by (2.11) to create instantaneous-frequency samples (IFM). All of the synchronicity may be orchestrated by a precision clocking source (2.12). The IFM samples may be converted to analog voltage/current by DAC (2.10) and the output lowpass filtered by (2.9) to adequately reduce sampling images. The IFM may then be impressed on the PLL (2.8) by using one- or two-point modulation. The output from the PLL (2.7) is ideally a phase-only modulated signal that when combined with the amplitude signal in (2.6) results in the desired reconstructed transmit signal. Gain block (2.5) may be used to provide additional signal level adjustment as desired.

Figure 4:
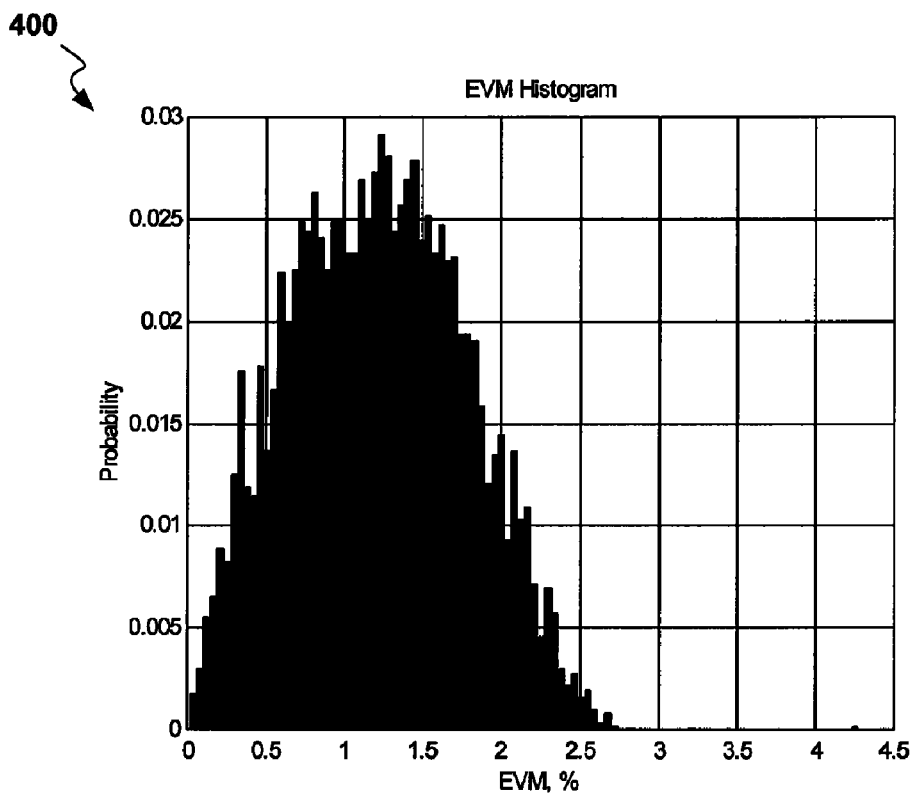
FIG. 4 shows a histogram of EVM values corresponding to the signal constellation shown in FIG. 3 when a classical polar implementation as shown in FIG. 10 is used.
Figure 5:
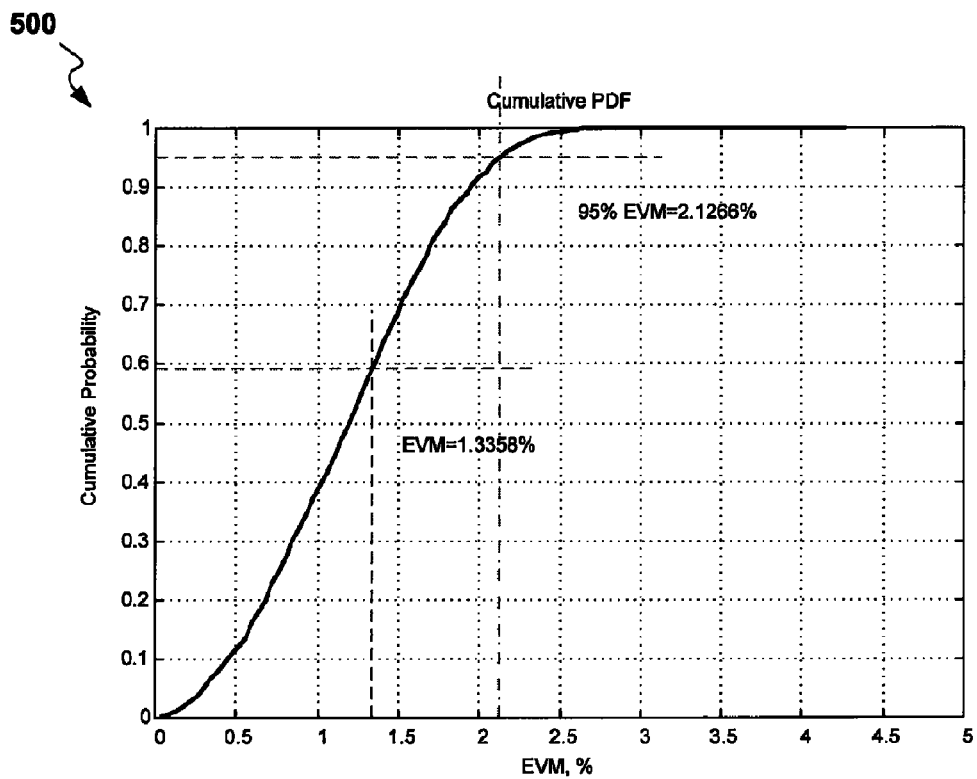
FIG. 5 shows the cumulative probability density function of EVM corresponding to FIG. 4.
Figure 8:
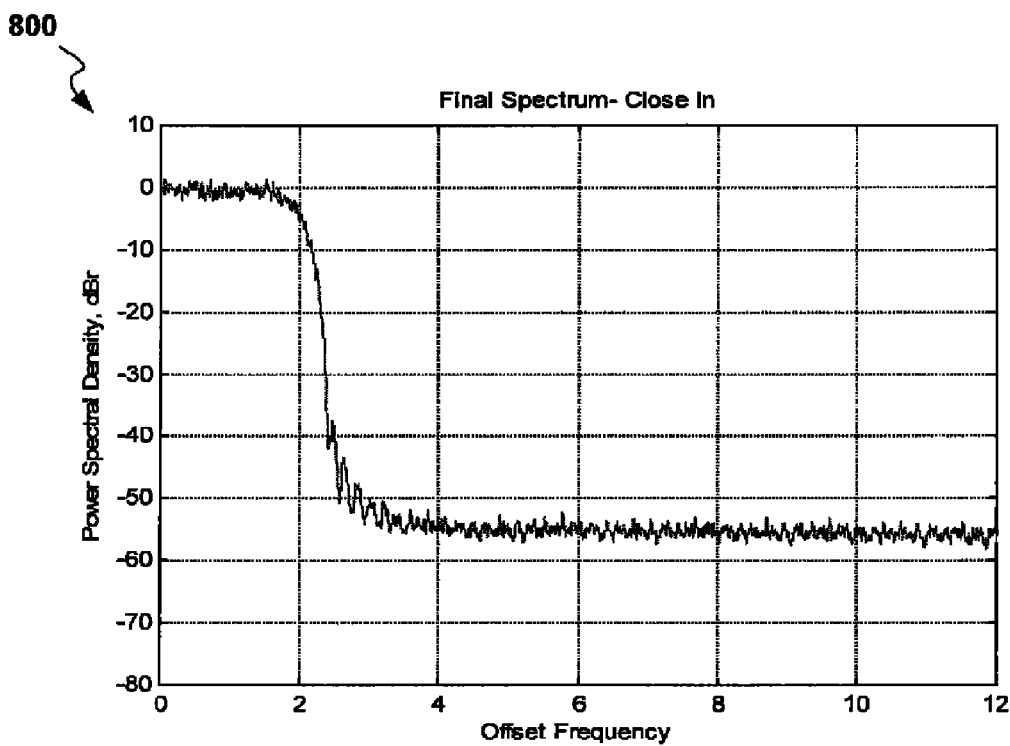
FIG. 8 shows the resultant one-sided transmit power spectral density when polar modulation is implemented as shown in FIG. 10 for the single voice channel WCDMA case.

Such signal trajectories are the primary contributor to the spectrum sidelobe floor level phenomenon shown in FIG. 8. Fundamentally, the amount of EVM degradation may be dependent on the anti-aliasing filter (10.9) bandwidth as well as the final sampling rate at the input to the rectangular-to-polar converter (10.11). The cumulative probability density function for the EVM histogram of FIG. 4 is shown in FIG. 5.

TABLE 1

Figure 10:
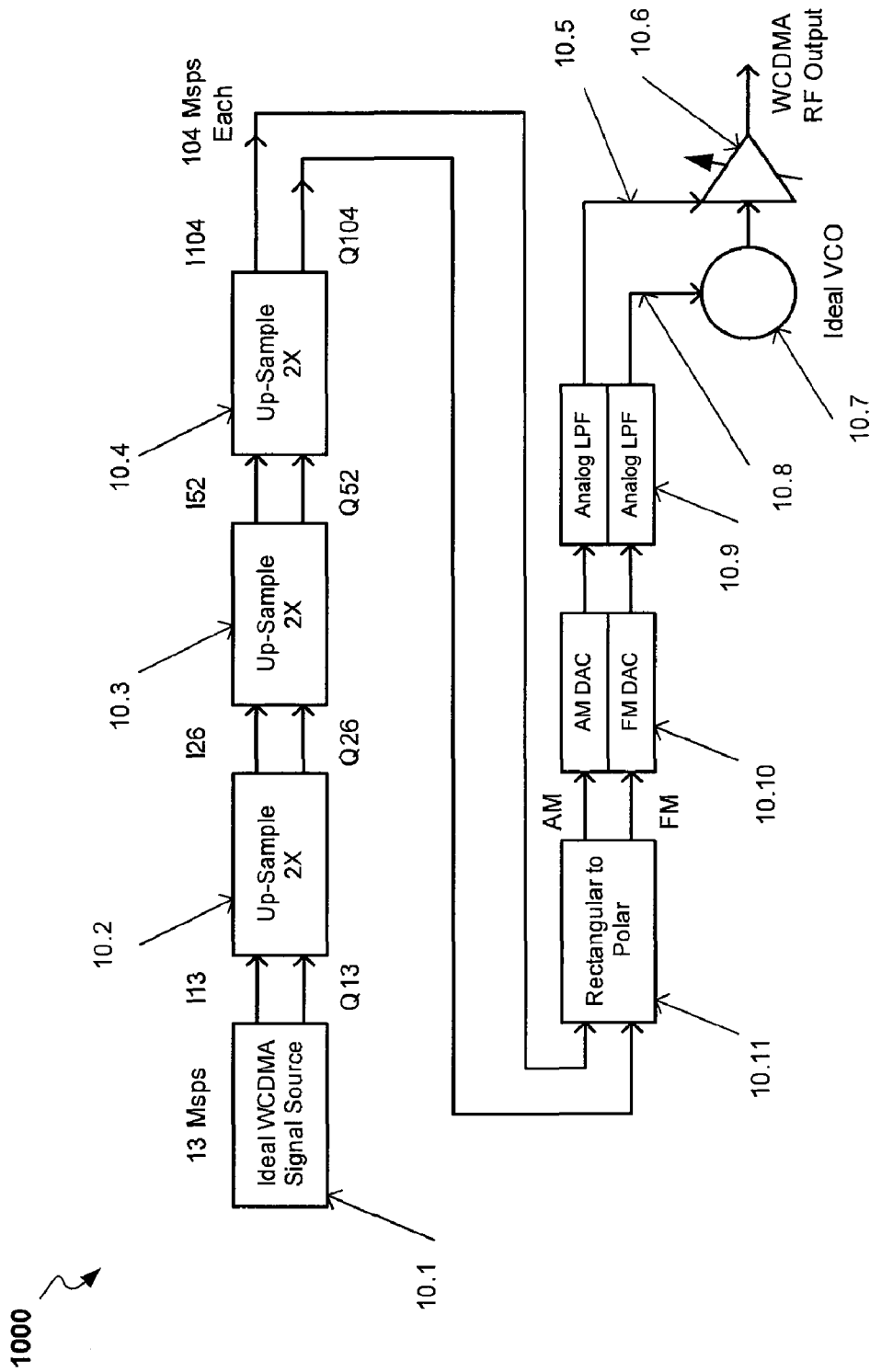
FIG. 10 illustrates one embodiment of a polar modulation implementation in which digital (I,Q) samples at 13 Msps are up-sampled to a rate of 104 Msps and then impressed on a frequency modulation (FM) path and amplitude modulation (AM) path to create a final transmit signal. The implementation details in this example are specifically chosen for the WCDMA signal case.

Summary of Key Parameters for the Polar Example Shown in FIG. 10

| Parameter | Value | Comments |
| --- | --- | --- |
| Initial WCDMA Input Signal Sampling Rate | 13 Msps | 13 MHz sampling on the I-channel, and same on Q-channel. Unlimited quantization |
| Up-Sampling Method | | Half-band FIR filters using 15-tap filters |
| Rectangular to Polar Method | At 104 Msps Rate | $AM_n = \dfrac{\sqrt{I_n^2 + Q_n^2} + \sqrt{I_{n-1}^2 + Q_{n-1}^2}}{2}$ (3) $FM_n = \tan^{-1}(I_n, Q_n) - \tan^{-1}(I_{n-1}, Q_{n-1})$ (4) |
| AM DAC Bits | 10 | |
| FM DAC Number of Bits | 10 | For WCDMA example, corresponds to a maximum peak frequency deviation of approximately 13 MHz. |
| Maximum dθ per Sample | 45° C. | |
| DAC Output LPFs | | |
| Filter Type | Butterworth | |
| Filter Order | 2 | |
| Filter -3dB Bandwidth | 25 MHz | |

An expanded view of one embodiment of the IQ to Polar Conversion (2.2) is shown in FIG. 10, where the $(I_k, Q_k)$ sample source (10.1) is operating at 13 Megasamples per second (Msps). Even though 13 Msps may be adequate to represent a WCDMA signal with excellent integrity in $(I_k, Q_k)$ coordinates, an ultimate sampling rate on the order of 104 Msps may be desirable before the IQ to Polar conversion is implemented in order to preserve signal quality. Up-sampling from 13 Msps to 104 Msps may be done on $(I_k, Q_k)$ samples rather than on $(R_k, \theta_k)$ samples in order to preserve signal fidelity. The up-sampling stages shown in FIGS. 10 as (10.2), (10.3), and (10.4) may be implemented by utilizing digital half-band filters to perform the up-sampling in an optimal manner.

The rectangular to polar conversion may be performed by (10.11) utilizing equation (1) in a COordinate Rotation DIgital Computer (CORDIC) implementation. The FM samples that are provided at the FM DAC (10.10) input may be created using a simple differentiator like (2.11) shown in FIG. 2. The FM DAC (10.10) output may then be passed through an anti-aliasing lowpass filter (10.9) and applied to the FM modulation port of the transmit PLL's VCO (10.7). The AM path in FIG. 10 may follow a similar path through an AM DAC followed by an anti-aliasing lowpass filter. The filtered AM path (10.5) may be used to restore the amplitude portion of the final transmit signal using a VGA (10.6). Specific details corresponding to one embodiment as shown in FIG. 10 are provided below in Table 1.

Figure 3:
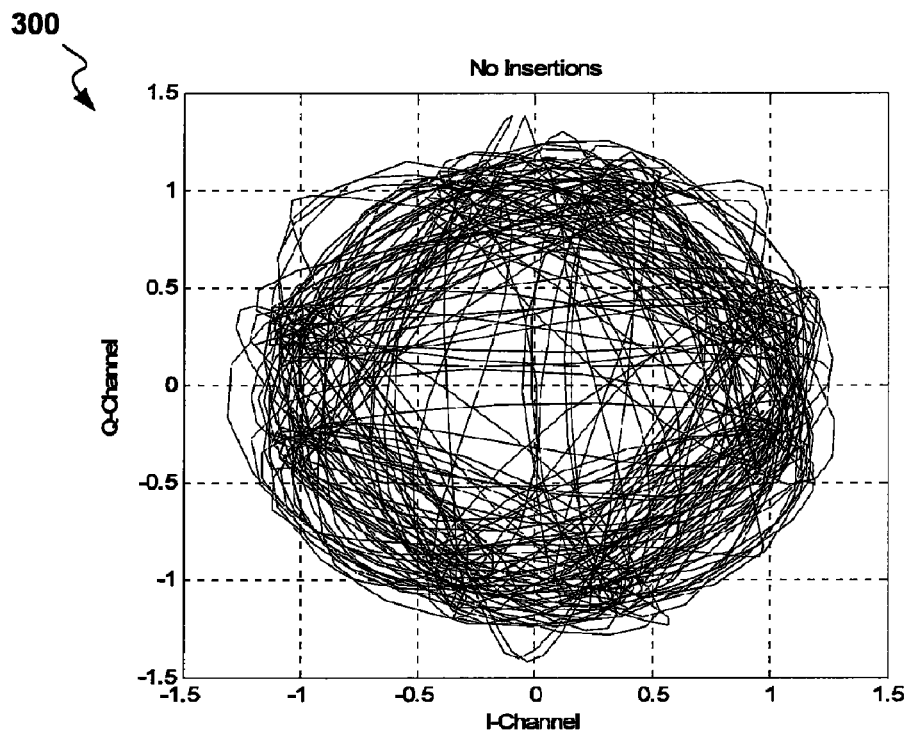
FIG. 3 shows an example of signal trajectories for a portion of a WCDMA single voice-channel waveform created using a polar implementation as shown in FIG. 10.

An output transmit signal IQ plot for one embodiment of a system as shown in FIG. 10 is shown in FIG. 3. Signal trajectories that pass near or through the origin of the plot are readily apparent. Due to the rectangular-to-polar conversion (10.11) and the finite bandwidth of the anti-aliasing filters (10.9) in FIG. 10, some EVM degradation results, as shown in FIG. 4 for an example single voice-channel WCDMA case.

Behavior of Polar Signal Components

The baseband bandwidth of the I- and Q-channel signals for the WCDMA example is approximately 4 MHz. Due to the square-root raised-cosine chip-shaping used in WCDMA, there is ideally no signal energy present at larger offset frequencies for the IQ rectangular signal representation.

Figure 6:
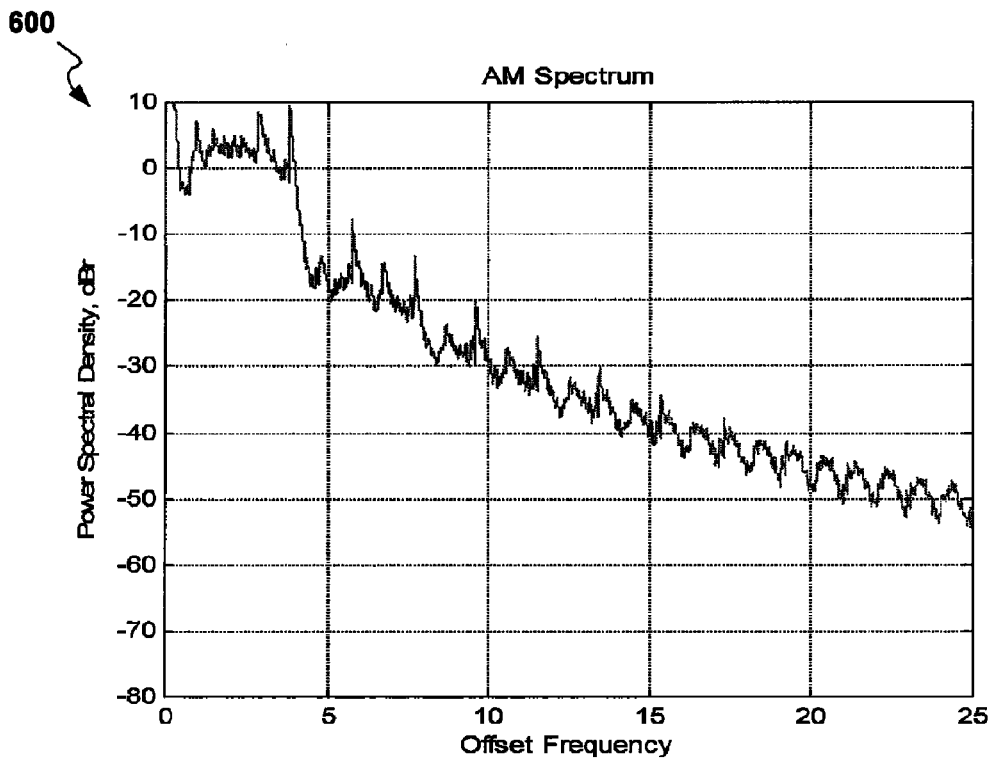
FIG. 6 shows the power spectral density of the signal amplitude path corresponding to a polar implementation as shown in FIG. 10 for the signal trajectory shown in FIG. 3.
Figure 7:
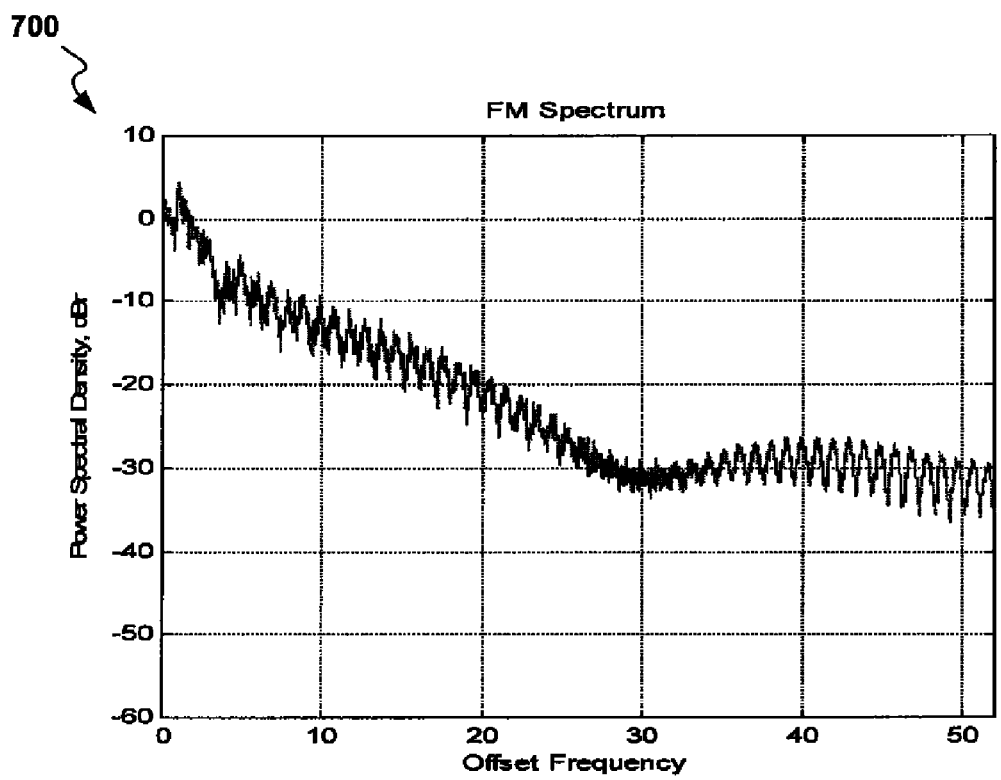
FIG. 7 shows the power spectral density of the instantaneous FM path corresponding to a polar implementation as shown in FIG. 10 for the signal trajectory shown in FIG. 3.

In contrast, the bandwidth extents of the AM and FM signal paths at the output of the rectangular-to-polar conversion block (10.11) in FIG. 10 are very large as shown in FIGS. 6 & 7 respectively. The notion of bandwidth in the FM signal case is elusive in FIG. 7 because the spectrum reaches a floor and is very slow to fall off with increased frequency. The large signal bandwidth results in an output spectral floor being created at approximately −55 dB relative to the signal's main lobe as shown in FIG. 8, which is problematic for ACLR considerations. In order for polar modulation systems to have spectrum performance parity with IQ modulation systems, this problem must be addressed.

STM Approach

Figure 9:
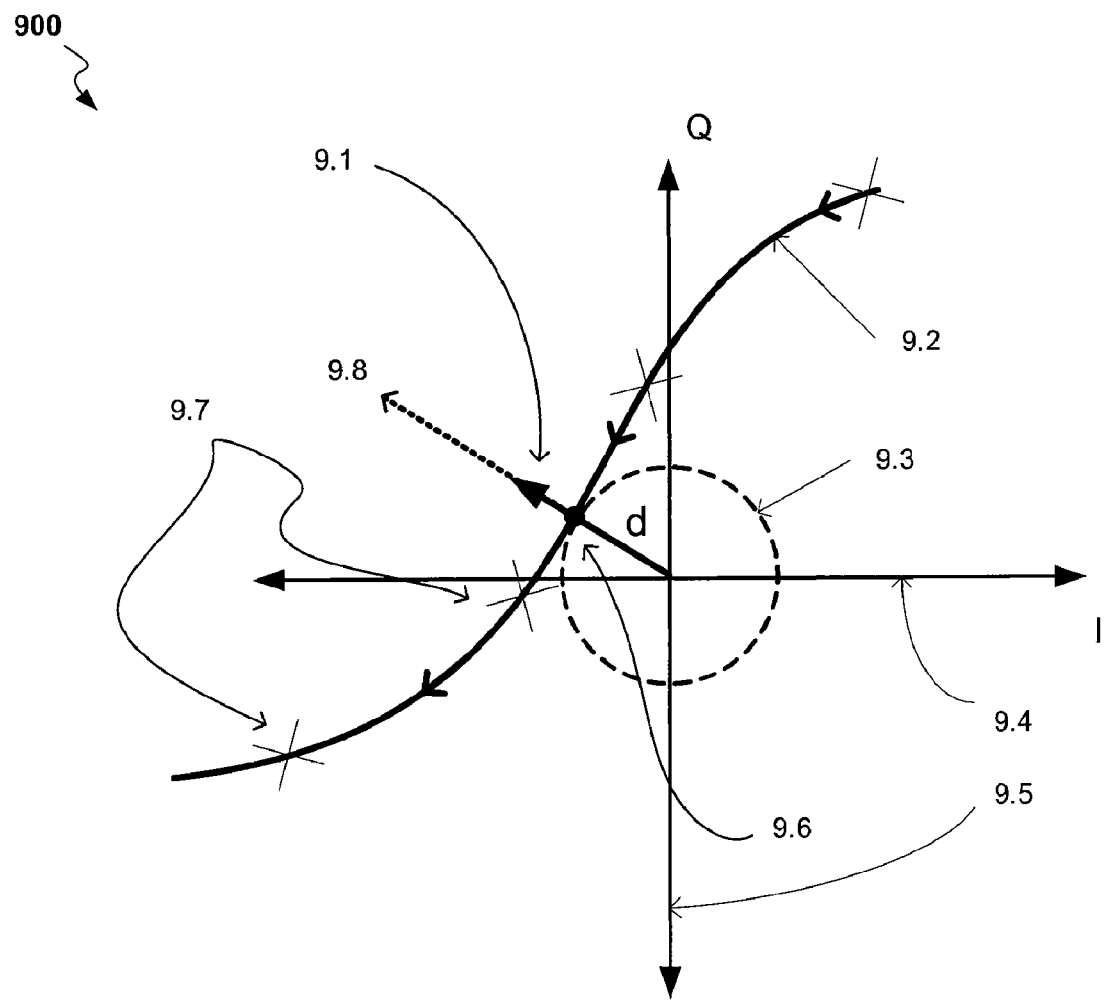
FIG. 9 illustrates an individual signal trajectory example plotted on in-phase (I) and quadrature-phase (Q) coordinates which passes near the origin.

FIG. 9 illustrates a problematic signal trajectory in IQ coordinate space. A close examination of the rectangular to polar signal processing reveals that the most problematic IQ signal trajectories for a polar system to handle correspond to signal trajectories passing close to the origin, such as trajectory (9.2). In FIG. 9, a problematic signal trajectory is plotted on the I-channel (9.4) and Q-channel (9.5) axes and the ideal $(I_k, Q_k)$ sample points are shown by the X marks (9.7). The ideal signal trajectory (9.2) comes within distance d (9.6) of the origin and it can be shown that the maximum instantaneous frequency for this trajectory corresponds to approximately this point. This point in the signal trajectory is also the point at which the path is tangential to the radius-d circle (9.3) as shown. In general, signal trajectories that fall within a given radius value D are the primary contributors to the flooring spectrum behavior shown in FIGS. 7 & 8.

Embodiments of the STM approach are designed to address problems associated with these problematic signal trajectories. According to certain aspects, the STM approach involves sacrificing a portion of EVM performance in return for lower bandwidth and precision requirements needed for the FM path. The reduced requirements on the FM path may be exploited to address a number of design issues, including (i) reducing the required number of D-to-A converter bits required for the θ signal for a specified spectrum performance level, (ii) reducing the high-frequency content of the θ(t) signal thereby allowing lower sampling rates to be used, and (iii) reducing the dynamic range requirements imposed on the power amplifier (PA) because the technique can be used to avoid an annular region centered at the constellation origin if desired.

In certain embodiments, improvements(s) in the FM signal path come at the expense of EVM performance. More specifically, the STM approach involves introducing a small, precisely controlled additive signal contribution wherever portions of the otherwise ideal WCDMA signal trajectories would fall too close to the constellation origin, thereby creating bandwidth issues for the FM signal path. Certain attributes that may provide one or more advantages will be described in greater detail in the following sections (as well as in Appendix 3 of related U.S. Provisional Patent Application Ser. No. 60/884,164, incorporated by reference herein in its entirety) and include:

1. In some embodiments, the signal that is used to modify the ideal WCDMA signal should be additive in nature in the I,Q signal space in order to retain the high degree of main-lobe spectrum containment desired;
2. In some embodiments, the signal that is used to modify the ideal WCDMA signal should ideally be a raised-cosine, root-raised-cosine or other spectrally-limited waveform such that the bandwidth limits of the ideal WCDMA signal are not undesirably expanded;
3. In some embodiments, the insertion of the STM signals should be done only when necessary in order to prevent unnecessary EVM degradation in trajectory cases for which the instantaneous FM path demands would be benign;
4. In some embodiments, implementation of the STM approach should be done such that the minimum amount of EVM performance degradation results in the maximum relaxation of the instantaneous FM path bandwidth and precision requirements for a given level of system performance impairment;
5. In some embodiments, the computations involved with construction of the STM waveforms should be minimal in order to facilitate minimum additional logic gate complexity and power consumption;
6. In some embodiments, implementation of the STM approach should ideally be done at the lowest sampling rate possible in order to keep gate-count and power consumption as low as possible.
7. In some embodiments, implementation of the STM approach should allow a gradual exchange of EVM performance versus FM path bandwidth and output spectrum performance versus parameter selection;
8. In some embodiments, implementation of the STM approach should provide flexibility in trading off design requirements for one or more of the following; (i) AM and FM DAC number of bits, (ii) AM & FM DAC sampling rate, (iii) output lowpass filtering, (iv) peak instantaneous frequency deviation of the VCO (if a VCO-based θ(t) reconstruction method is used as shown in FIG. 2), (v) EVM versus sidelobe spectrum performance.

General STM Methodology

Figure 11:
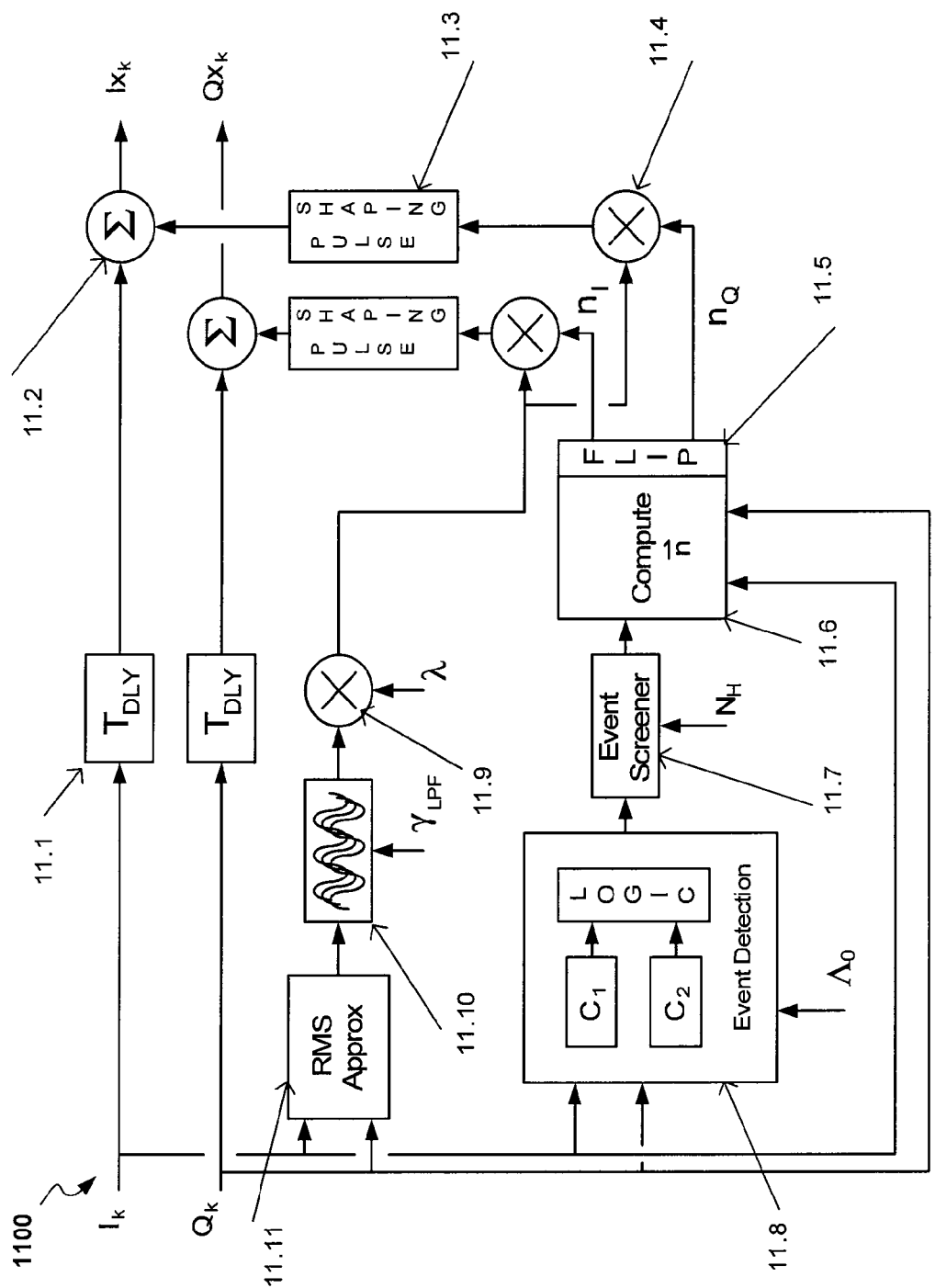
FIG. 11 illustrates one embodiment of the internal operation of an STM module in accordance with aspects of the present invention that is used to reduce the bandwidth of the final polar modulation by modifying the otherwise ideal (I,Q) signals.

FIG. 11 illustrates one embodiment of an STM system module according to certain aspects of the present invention. In some embodiments an STM module providing a core implementation of the STM approach according to the present invention may be composed of one or more blocks as shown in FIG. 11. It will be recognized by those of skill in the art that some of these blocks may be modified, eliminated, or rearranged depending on the application, and that parameters such as sample rates and sample rate conversion factors as described with respect to FIG. 11 are not limited to the values described therein and may include other values depending on the application. It will be further recognized that the blocks as shown in FIG. 11 may generally be grouped into various modules including a detection module, comprised of blocks such as 11.7 and 11.8 associated with detecting signals with paths that follow undesirable signal trajectories subject to correction by the present method, and a correction module comprised of blocks such as 11.1-11.6 and 11.9-11.11 associated with synthesizing and adding correction signals to the undesirable signal paths in order to reduce bandwidth or other relevant parameters associated with the signals.

In one exemplary embodiment, an STM module as shown in FIG. 11 may accept ($I_k$,$Q_k$) sample-pairs at a 26 Msps rate and may output a modified ($I_k$,$Q_k$) sample-pair stream at this same rate. The STM module may be inserted in a signal processing stream as shown in FIG. 10 after the signal is up-sampled to 26 Msps (10.2) and before the signal is up-sampled to 52 Msps (10.3). In some embodiments remaining portions of FIG. 10 may otherwise be unchanged aside from the requirements relief that can be taken advantage of for primarily the FM signal path. Each of the blocks shown in FIG. 11 will be further described below.

Certain embodiments of the STM implementation consist of the following aspects as shown in FIG. 11:

1. The STM approach may be implemented at a 26 Msps rate as a compromise choice. Estimation of signal trajectories may be more difficult if a significantly lower sample rate is used whereas a significantly higher rate may result in a higher gate-count and power consumption than is warranted or desirable. It will be noted by those of skill in the art that other sample rates and upconversion stages can be used within the spirit and scope of the present invention.
2. In some embodiments, a continuous-running estimate of the input WCDMA signal root mean square (RMS) level may be maintained by an RMS Approximation block (11.11). The RMS Approximation block may operate at a variety of sample rates based on processing requirements and capabilities. To take advantage of reduced processing requirements at lower sampling rates, in certain embodiments an RMS Approximation block may operate at a sample-pair rate of 13 Msps and its output may be averaged into a usable low-variance value by a $\gamma_{LPF}$ Filter Block (11.10) which may be implemented as a simple first-order recursive IIR filter. The RMS value weighted by a scaling parameter k may be used to set the maximum magnitude (11.9) for the trajectory modification signals that can be added to the input ($I26_k$, $Q26_k$) signal samples. In certain embodiments, if the input signal RMS value to the first up-sampling block (10.2) is a known constant value, this block's output can be replaced by a fixed constant value.

Figure 12:
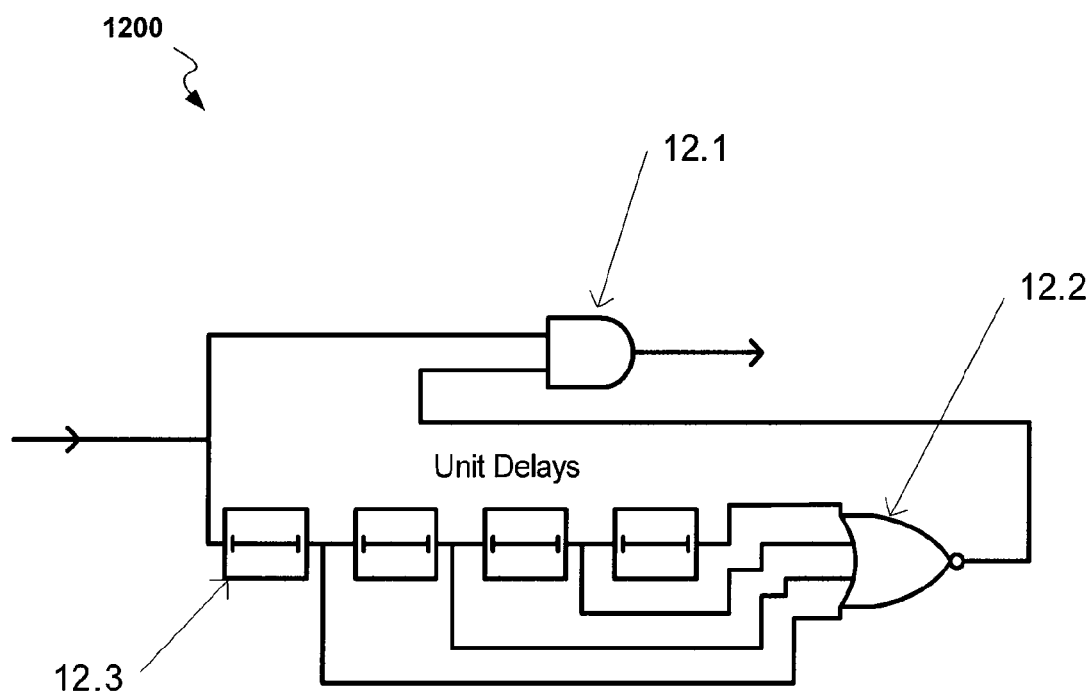
FIG. 12 illustrates one embodiment of the logic design for an Event Screener module.

3. In some embodiments an Event Detection logic block (11.8) may make use of various algorithms to estimate when the present-time signal constellation trajectory will result in excessive dθ/dt demands being asserted on the FM signal path if not dealt with. The parameter $\Lambda_o$ is related to the maximum dθ/dt value that is deemed acceptable (based on FM DAC and VCO peak-deviation limitations) and it may be used to determine the threshold at which events will be declared.
4. In some embodiments it is possible that an Event Detection block may identify consecutive time-samples that exceed the detection threshold limits and declare event detections for each one. If not dealt with, this could lead to an excessive amount of signal trajectory modification and unacceptable EVM degradation. An Event Screener block (11.7) may be used to only assert a logic-true output provided that there is a detection for the present $(I_k,Q_k)$ input sample pair from the Event Detection block, and no other detection has occurred for the previous $N_H$ sample-pairs, where $N_H$ is an application specific parameter. A logic diagram of one implementation of an Event Screener is illustrated in FIG. 12.
5. In some embodiments, a Compute n block (11.6) may make use of the present $(I_k,Q_k)$ sample-pair to compute a normalized vector value which results in an optimally-adjusted pulse insertion for the signal trajectory modification. Owing to the 4-quadrant nature of the signal constellation space, additional Flip-logic (11.5) may be used to correctly position the normalized vector value into the proper signal quadrant. The normal to the signal trajectory is represented by (9.8) in FIG. 9.
6. In some embodiments, Pulse-Shaping blocks (11.3) may each contain the impulse response of a unit-height, band-limited Nyquist pulse which is properly band-limited. The impulse-like outputs from Flip-logic (11.5) may first be multiplied (11.4) by a weighting factor λ, convolved with this impulse response to create the signal trajectory modification pulses. These may then be numerically summed (11.2) with the input $(I_k,Q_k)$ sample pairs to provide the modified outputs. The summation of this signal with the input $(I_k,Q_k)$ sample stream causes the signal trajectory to be pushed away from the origin by a desired amount as represented by (9.1) in FIG. 9.
7. In some embodiments, Time-delay blocks (11.1) denoted by $T_{DLY}$ may be used to time-align the input $(I_k,Q_k)$ signals with the STM computed signal values prior to additive-combining in (11.2).

STM Approach RMS Approximation

In certain embodiments, an approximation of the RMS value of the input $(I_k,Q_k)$ sample-pair stream may be determined as shown in (11.11) in FIG. 11. In one exemplary embodiment, a process for calculating the RMS value of the input $(I_k,Q_k)$ sample-pair stream as shown in (11.11) is given in (5) as: (see also Appendix 6 of related U.S. Provisional Patent Application Ser. No. 60/884,164, incorporated by reference herein in its entirety)

$$RMS_k = \max(|I_k|,|Q_k|) \pm 0.375(|I_k|,|Q_k|) \qquad (5)$$

The accuracy of this approach is very attractive given its simplicity, however, it will be recognized by one of skill in the art that other methods may be used for RMS approximation if desired.

The RMS Approximation block may be followed by a simple first-order recursive infinite impulse response (IIR) filter that may be used to reduce the variance of the RMS calculation to a desired level. In one exemplary embodiment, the recommended processing for this IIR filter is given in (6) by $$RMSF_{k+1} = \gamma_{LPF} RMSF_k + (1-\gamma_{LPF}) RMS_k \qquad (6)$$

where $RMSF_k$ represents the smoothed low-variance RMS estimate for the input $(I_k,Q_k)$ sample-pair stream. In this form, $0 < \gamma_{LPF} < 1$. The −3 dB frequency of this filter is given by (7) as $$F_c = \frac{F_s}{\pi} \frac{1-\gamma_{LPF}}{1+\gamma_{LPF}} \qquad (7)$$

where $F_s$ is the sample-pair rate of 26 Msps in the present embodiment. The WCDMA chip-rate is 3.84 MHz and this value is used below in Table 2 to estimate the number of chip-times required before the filter responds. In some embodiments, useful values for $\gamma_{LPF}$ may range from roughly 0.90 to 0.99.

TABLE 2

Bandwidth Relationships for $\gamma_{LPF}$ Filter

| $\gamma_{LPF}$ | $F_c$, kHz | $(F_{Chip}/F_c)$ (Est. Response, Chip-Times) |
|---|---|---|
| 0.80 | 920 | 4.2 |
| 0.9 | 436 | 8.81 |
| 0.95 | 212 | 18.11 |
| 0.99 | 42 | 92.4 |

The output from the $\gamma_{LPF}$ filter may be weighted by the parameter λ, which sets the upper limit for the magnitude of the STM insertions. In some embodiments, the useful range for λ may be $0 \leq \lambda < 0.20$.

STM Approach Event Detection

In certain embodiments detecting dθ/dt may be done by monitoring whether a candidate signal trajectory invades a specific annular region about the origin of the signal constellation plane. However, in some embodiments a more attractive, simple, and reliable detection metric may be used based on the quantity Δθ/Δt, where Δt is the digital sampling time interval and Δθ can be computed based on $(I_k,Q_k)$ input sample pairs alone. Using a detection metric that is based on dθ/dt may be preferable since the FM signal path is typically the most problematic. Based on the annular region that is carved out in the WCDMA constellation (see, e.g., FIG. 13) with the STM approach applied, and the fact that mid-chip signal trajectories normally have a high slew-rate if they cross near the constellation origin, advocating an annular "keep-out" region centered at the origin is synonymous with adopting a criteria like the angular one disclosed here. Therefore, it is recognized that an annular-based event detection metric could be adopted if desired, but for some embodiments the method disclosed here may be superior in simplicity and accuracy.

In some embodiments, phase differentiation may be implemented by simply taking the difference between the phases of adjacent $(I_k,Q_k)$ sample pairs. In other embodiments, improved performance may be obtained by applying different methods to implement phase differentiation.

It can be shown (see, e.g. Appendix 3 of related U.S. Provisional Patent Application Ser. No. 60/884,164, incorporated by reference herein in its entirety) that the phase difference between two time-adjacent $(I_k,Q_k)$ sample-pairs is given by (8)

$$\Delta\theta_k = \tan^{-1}\left[\frac{Q_k I_{k-1} - Q_{k-1} I_k}{I_k I_{k-1} + Q_k Q_{k-1}}\right] \quad (8)$$

Assume that the maximum $\Delta\theta_k$ that is acceptable after application of the STM approach is given by $\phi$. After substituting this into (8) and re-arranging the equation, the result can be written as (9) (see also Appendix 4 of related U.S. Provisional Patent Application Ser. No. 60/884,164, incorporated by reference herein in its entirety).

$$\tan(\phi)[I_k I_{k-1} + Q_k Q_{k-1}] - [Q_k I_{k-1} - Q_{k-1} I_k] \geq 0 \quad (9)$$

Substitution of $\Lambda_o$ for $\tan(\phi)$ provides one exemplary embodiment of an Event Detection algorithm. Applying this algorithm, an Event Detection may be declared if the conditions of (10) are met (see also Appendix 6 of related U.S. Provisional Patent Application Ser. No. 60/884,164, incorporated by reference herein in its entirety).

$$C_2 \leq 0$$

or $$C_1 - \Lambda_o |C_2| \geq 0$$

for $$C_2 = I_k I_{k-1} + Q_k Q_{k-1}$$

$$C_1 = |Q_k I_{k-1} - Q_{k-1} I_k| \quad (10)$$

STM Approach Event Screener

In some embodiments it may be necessary to prevent consecutive Event Detections from all being passed through to the subsequent signal processing (see, e.g., Appendix 6 of related U.S. Provisional Patent Application Ser. No. 60/884, 164, incorporated by reference herein in its entirety). This process may be done in a variety of ways, including through application of logic that screens for successive events and produces a corresponding output, including output logic that blocks subsequent detection signaling until a preset number of detections has occurred. The number of successive Detection Events screened may be denoted as the sample-depth. At a 26 Msps $(I_k, Q_k)$ sample rate, a recommended sample-depth for this screening action is 4. It will however be recognized by one of skill in the art that other sample-depths may be used depending on the application. The logic diagram of FIG. 12 shows one embodiment of a screening operation implemented with standard logic gates and unit delay blocks with a sample-depth of 4.

STM Approach Determination of Normal Vector $\bar{n}$

In some embodiments correction signals to be combined with a transmit signal should be additive in nature to the IQ signal components of the transmit signal. The STM approach signals that are added to the original $(I_k, Q_k)$ sample streams as shown in FIG. 11 must be carefully designed in order to provide the maximum benefit with minimal EVM degradation. In some embodiments, the Event Detection method may be used to provide coarse-timing information about when a given signal trajectory presents the worst $d\theta/dt$ behavior to the system. This information may, however, be limited to time-increments of the sample clock being used. Without special care being taken, it is possible, and may actually be likely, that an inserted signal can push a given signal trajectory nearer to the constellation origin, thereby worsening the problem with $d\theta/dt$ rather than improving it.

In order to provide the greatest benefit in reducing $|d\theta/dt|$ for a given amount of introduced additive signal modification (i.e., EVM degradation), the original signal trajectory shown in FIG. 9 should be "pushed" away from its path in a direction that is orthogonal to itself, and this orthogonal direction should be computed at the time-point of closest signal approach (FIG. 9, (9.6)). This time point does not, however, generally correspond to an available discrete-time $(I_k, Q_k)$ sample-pair.

If the available discrete-time $(I_k, Q_k)$ sample-pairs that are nearest to the Event Decision are used in a linear point-intercept formula (e.g., y=mx+b), it can be shown that the $(I_p, Q_p)$ coordinates for the point of closest-approach to the origin are given by (11) (see also Appendix 4 of related U.S. Provisional Patent Application Ser. No. 60/884,164, incorporated by reference herein in its entirety).

$$I_P = \frac{m(Q_k - mI_k)}{1 + m^2} \quad (11)$$

$$Q_P = mI_P + b$$

Precise calculation of the point's coordinates is, however, unnecessary since all that is required is knowledge of which quadrant the point resides in. It can be shown that the point $(I_p, Q_p)$ has the quadrant behavior listed in Table 3 with the following definitions (12) applied (see also Appendix 5 of related U.S. Provisional Patent Application Ser. No. 60/884, 164, incorporated by reference herein in its entirety).

$$d_1 = I_{k+1} - I_{k-1}$$

$$d_2 = Q_{k+1} - Q_{k-1}$$

$$d_3 = Q_k d_1 - I_k d_2 \quad (12)$$

Based on the signs of $I_P$ and $Q_P$, the quadrant of the point can be readily determined, and when the unit-normal n is computed for $|d_1|$ and $|d_2|$ placing it in the first-quadrant as $(n_x, n_y)$, the so-called Flip-logic amounts to directly applying the signs of $I_P$ and $Q_P$ to $n_x$ and $n_y$ respectively.

TABLE 3

Point P (FIG. 9, (9.6)) Quadrant Determination Based on $d_x$

| Point P Coordinate | Sign of Coordinate | Required Conditions |
|---|---|---|
| $I_P$ | >0 | ( ($d_2$ > 0) AND ($d_3$ < 0) ) OR ( ($d_2$ < 0) AND ($d_3$ > 0) ) |
| $Q_P$ | <0 | ( ($d_1$ > 0) AND ($d_3$ > 0) ) OR ( ($d_1$ < 0) AND ($d_3$ < 0) ) |

The optimal phase orientation for the signal trajectory modification signals is given by the unit-normal vector to the signal trajectory at point P. When the voltage change between adjacent samples dI and dQ is restricted to the first-quadrant for illustrative purposes, the unit-normal vector n can be computed as in (13).

$$\vec{n} = (n_x, n_y) = \left[\frac{dQ}{\sqrt{dI^2 + dQ^2}}, \frac{-dI}{\sqrt{dI^2 + dQ^2}}\right] \quad (13)$$

This unit-normal vector can be more easily calculated by using a CORDIC-like iterative algorithm based on the dot-product between $(n_x, n_y)$ and (dI, dQ) (see, e.g. Appendix 5 of related U.S. Provisional Patent Application Ser. No. 60/884, 164, incorporated by reference herein in its entirety). Extending the result to all 4-quadrants may be done by following the guidelines provided previously in Table 3. For (dI, dQ) confined to the first-quadrant, the pseudo-code for a CORDIC-like computation is as shown below in Table 4.

TABLE 4

Pseudo-Code for First-Quadrant Unit-Normal Calculation u = 1
v = 0
K = 1
for j=1 to N
    z = u dI + v dQ
    if (z ≧ 0)
        ut = u + v $T_j$
        v = v − u $T_j$
        u = ut
    else
        ut = u − v $T_j$
        v = v + u $T_j$
        u = ut
    end
    K = K $S_j$
end
$n_x$ = K u
$n_y$ = K v STM Approach Signal Insertion Amplitude In some embodiments, in order to further reduce the impact on EVM performance, the magnitude of the insertion signal may be made proportional to the scaling parameter λ as well as proportional to the amount by which the Event Detection event exceeds the threshold level given by $\Lambda_o$. It will be recognized by one of skill in the art that other variants of this amplitude proportionality may be adopted if desired, however, the following method may provide advantages based on simplicity of implementation.

When the fully-developed unit-normal vector is given by ($n_x$, $n_y$), and with λ and $\Lambda_o$ as defined earlier, the signal insertion amplitudes applied to the I and Q pulse-insertion (FIG. 11 (11.4)) paths may be given by (14), $$pulse_x = \frac{\Lambda - \Lambda_o}{\Lambda_o} \lambda n_x \quad (14)$$

$$pulse_y = \frac{\Lambda - \Lambda_o}{\Lambda_o} \lambda n_y$$

where Λ is the metric computed in the Event Detection algorithm. Although not stated elsewhere, the value of Λ is strictly positive and is limited to a maximum value of π.

STM Approach Pulse-Shaping Filters

Non-zero outputs from the unit-normal calculations can occur at any time, separated by as few as $N_H$ time samples. With this perspective in mind, it may be desirable to assemble the signal modification signals using a convolution of the unit-normal vector samples and the desired pulse shape in order to accommodate the superposition of multiple events.

A wide range of pulse-types may be considered for this role. In certain embodiments one choice would be to use the same pulse shape as used for the WCDMA chips themselves (i.e., square-root raised-cosine pulses with β=0.22). However, in some embodiments this would lead to a slowly-decaying time-pulse which could result in additional gate-count both in the pulse-shaping FIR filters as well as in the time-delays. Since the inserted pulses may only be applied intermittently and with a fairly low amplitude, wider pulse spectrums which decay more quickly in time may be used to reduce the gate-count in this area. Owing to its more rapid time-decay compared to the square-root raised cosine pulse, one exemplary approach is to use a raised-cosine pulse shape with an excess bandwidth parameter of 0.50. The shorter pulse shape of this approach may also result in less EVM degradation.

Example STM Approach Results for WCDMA Single Voice-Channel

A cursory comparison of one embodiment of the polar modulation method as shown in FIG. 10, with and without application of an embodiment of the STM approach as shown in FIG. 11, is given in Table 5 below.

Figure 13:
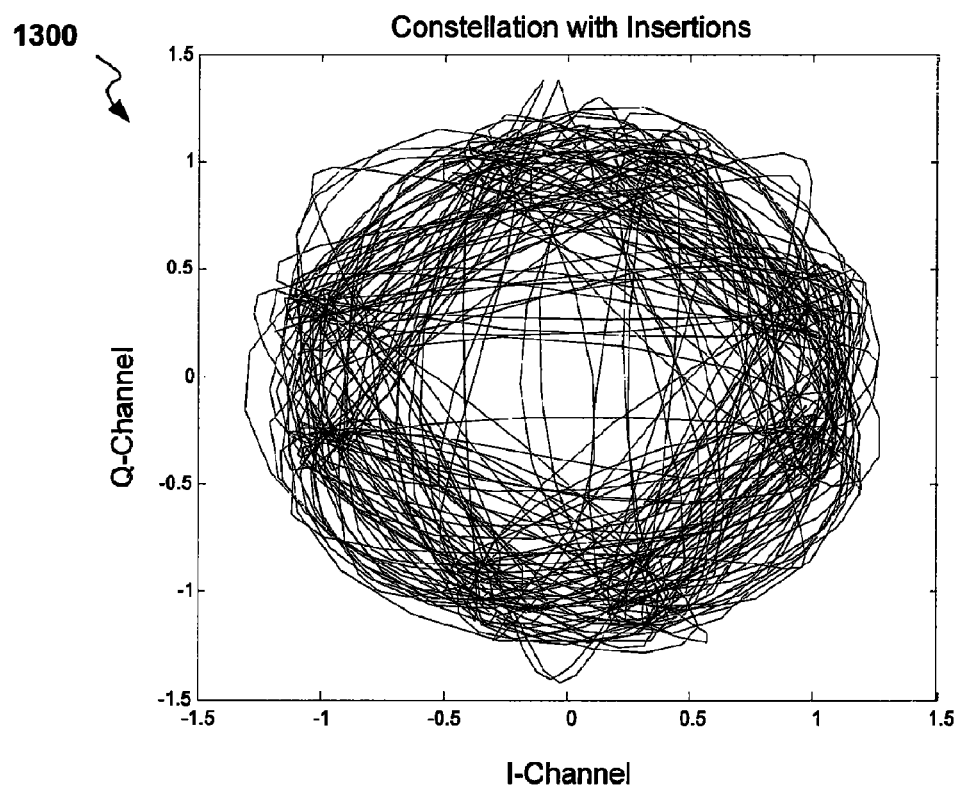
FIG. 13 shows an example of the WCDMA single voice-channel signal trajectory behavior after implementation of an embodiment of the STM approach.
Figure 14:
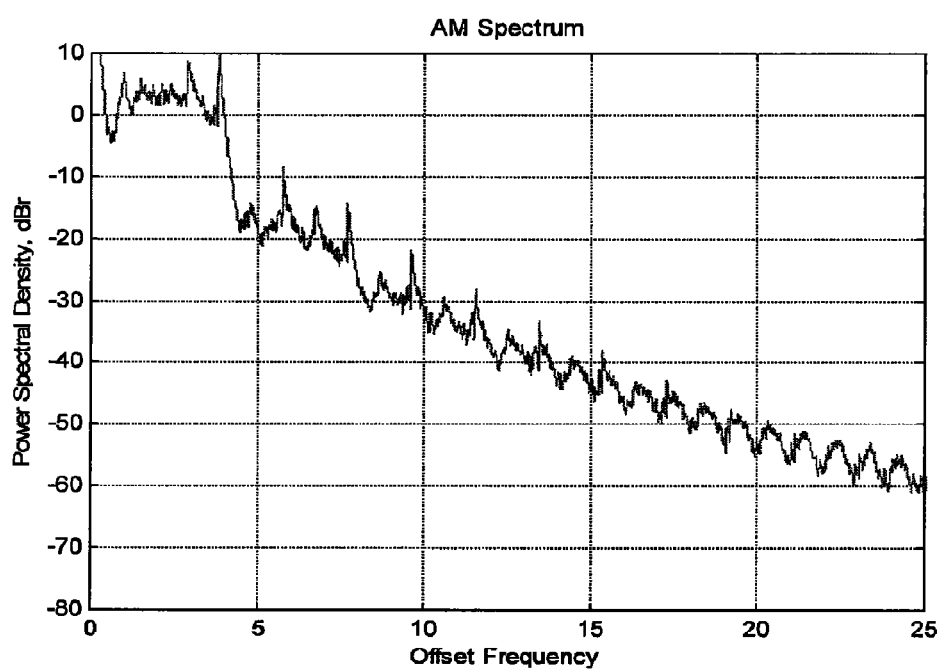
FIG. 14 shows the power spectral density of the signal amplitude path after implementation of an embodiment of the STM approach, for the signal trajectory shown in FIG. 3.
Figure 15:
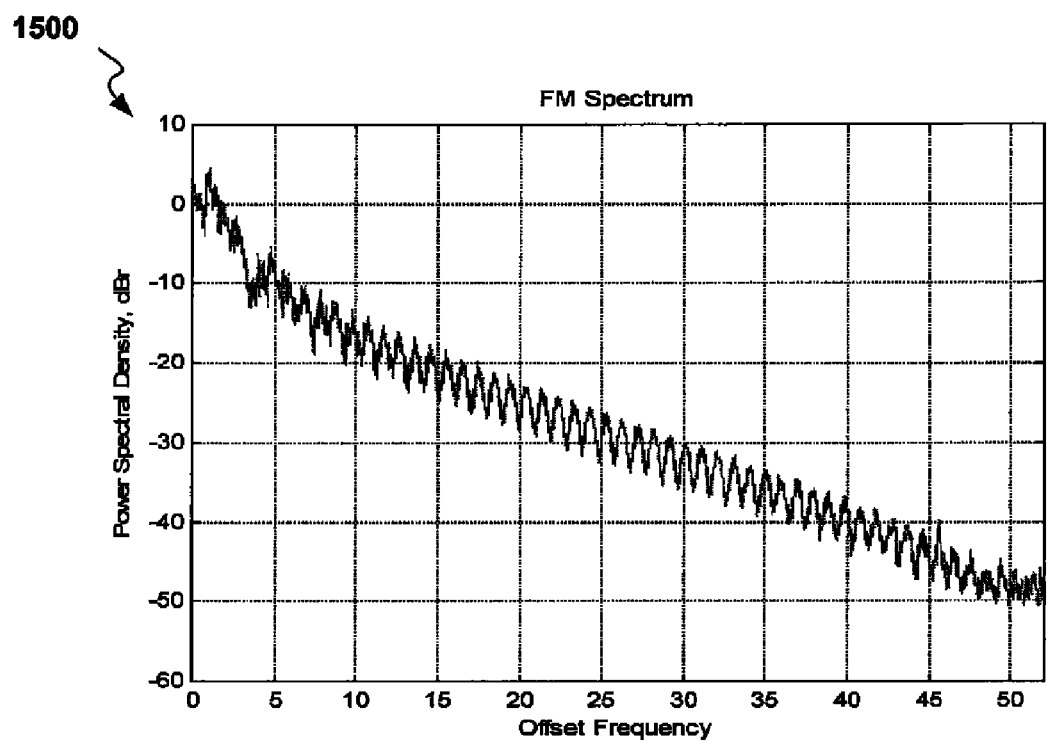
FIG. 15 shows the power spectral density of the signal instantaneous FM path after implementation of an embodiment of the STM approach for the signal trajectory shown in FIG. 3.
Figure 16:
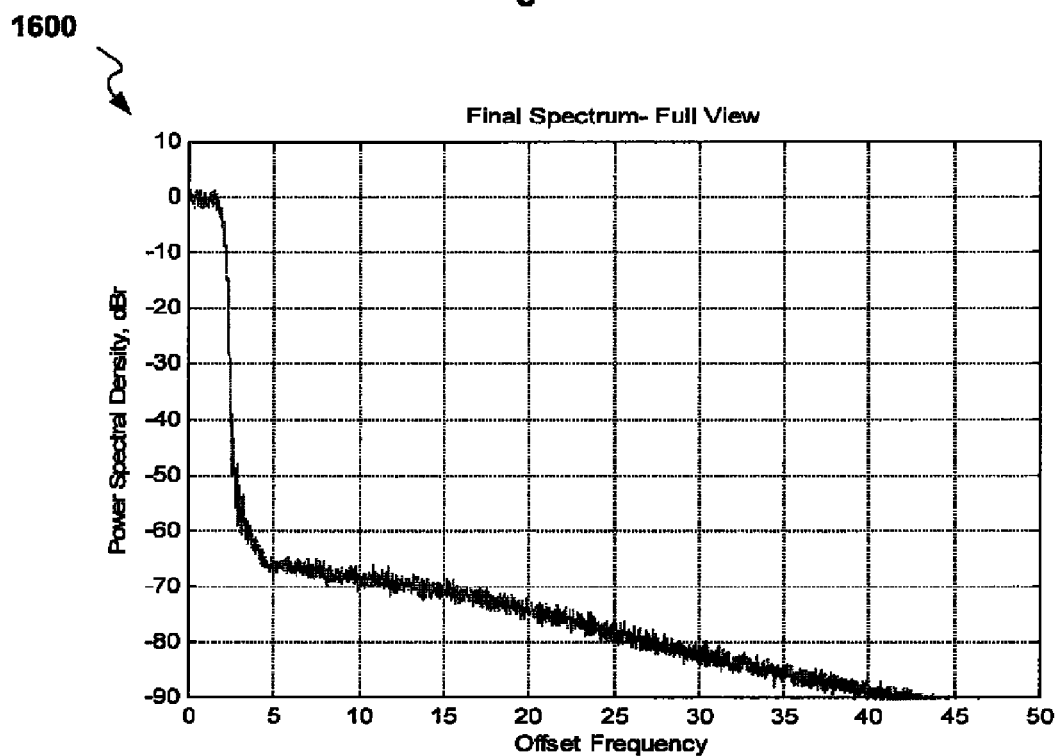
FIG. 16 shows the one-sided power spectral density of the final transmitter output implemented with an embodiment of the STM approach.

The improvement in spectrum levels at 3.5 MHz and 8.5 MHz is substantial as shown. The signal trajectory behavior for the transmit signal with the STM approach applied is shown in FIG. 13 where a core keepout region is clearly apparent. Although the AM path power spectral densities with and without the STM approach applied do not differ significantly, as shown in FIG. 6 and FIG. 14 respectively, the improvement in the FM power spectral density is dramatic. The FM power spectral density with and without the STM approach applied is shown in FIG. 7 and FIG. 15 respectively. Similarly, the output transmit power spectral density performance at frequency offsets greater than 5 MHz are dramatically improved as shown in FIG. 16 with the STM approach applied versus FIG. 8 without it.

Figure 17:
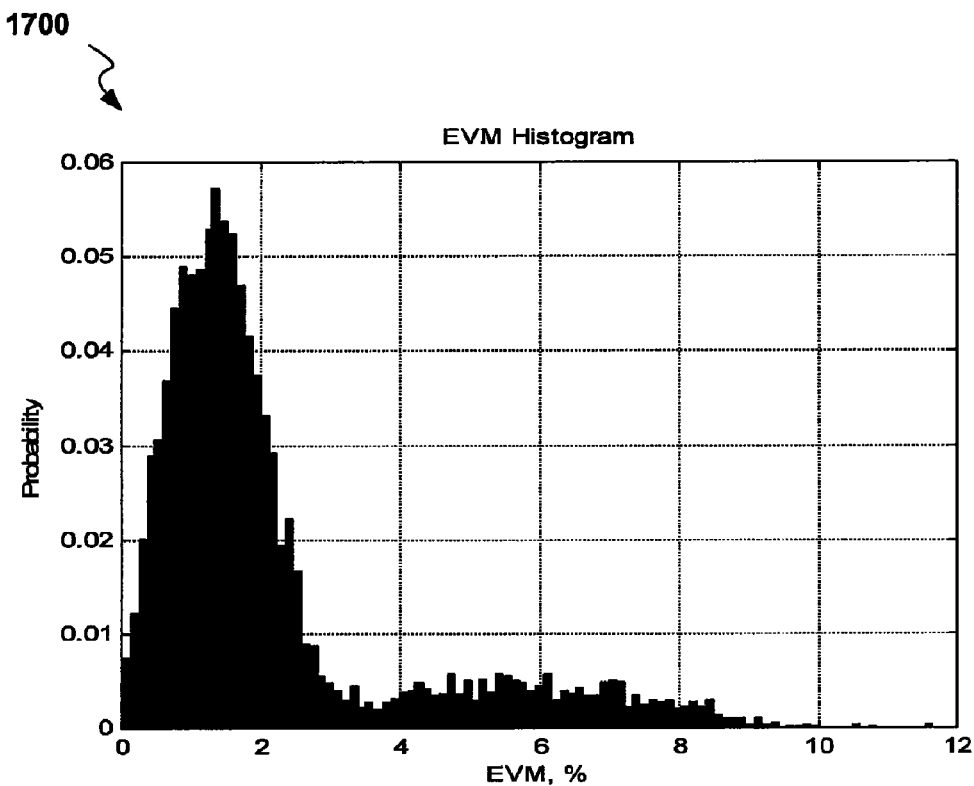
FIG. 17 shows the probability density of EVM samples for the final transmit signal implemented with an embodiment of the STM approach.
Figure 18:
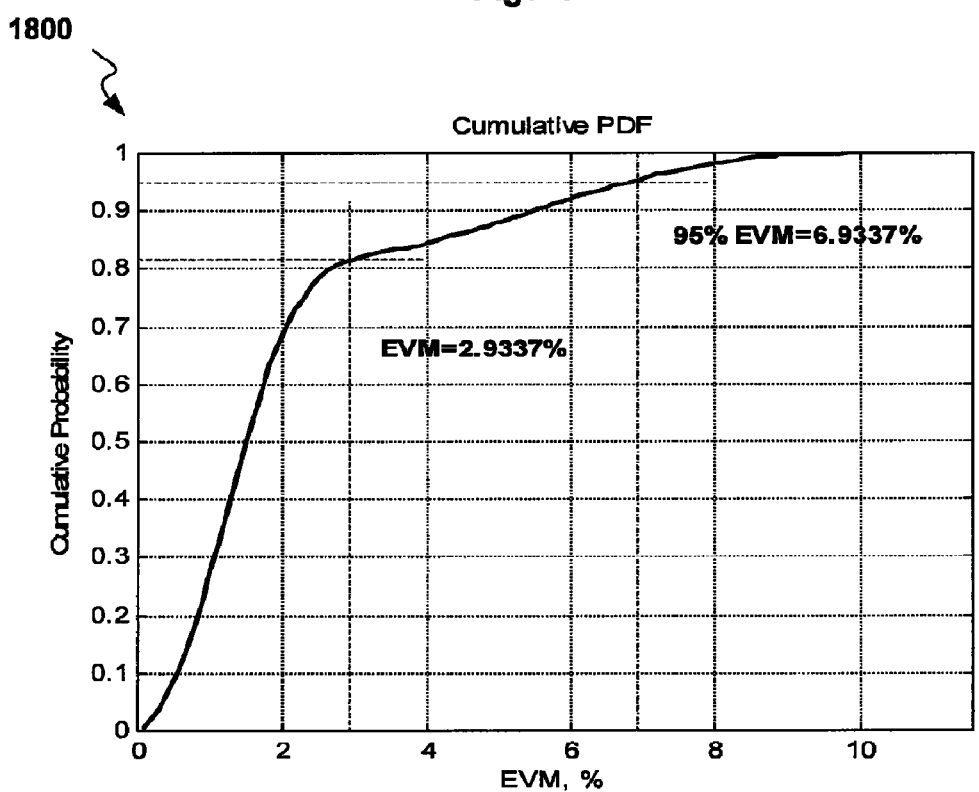
FIG. 18 shows the cumulate probability density corresponding to FIG. 17.

In some embodiments, use of the STM approach may degrade the EVM performance of the transmitter slightly as shown by the histogram in FIG. 17 and the corresponding cumulative probability density function shown in FIG. 18. In optimizing system performance, EVM performance may be traded for improved spectral performance or vice-versa.

TABLE 5

Comparison of Polar Methods With and Without the STM Approach for One Embodiment

| Performance Metric | Traditional Polar Method | With Enhancement Method (with λ = 0.10, dθ maximum = 45°, in addition to parameters from Table 1) | Comments |
|---|---|---|---|
| Spectrum Levels @3.5 MHz @8.5 MHz | −54.32 dBr −55.61 dBr | −60.86 dBr −68.23 dBr | Dramatic improvement of the spectrum at 8.5 MHz offset as well as substantial improvement at 3.5 MHz |
| EVM Average 95% Value | 1.34% rms 2.13% rms | 2.93% rms 6.93% rms | Both methods are well within the WCDMA performance specification |

STM Approach Design Parameter Choices

A number of different design parameters may enter into the resultant performance and benefit assessment of using the STM approach. In order to limit the tradeoff considerations to a reasonable scope for example purposes, the parameters considered in the embodiment described here include only the signal insertion amplitude parameter λ, the maximum allowed dθ permitted per sample (at 104 Msps rate), and the threshold parameter $\Lambda_o$. All other parameters are otherwise left as described in Table 1 and FIG. 10. Performance of various parameter choices are collected below in Table 6.

TABLE 6

Performance Comparison Versus Key Parameter Selections

| | | | Sidelobe Spectrum, - dBr | | EVM, % RMS | |
| --- | --- | --- | --- | --- | --- | --- |
| | Max dθ, | | @ 3.5 | @ 8.5 | | |
| $\Lambda_o$ | deg. | λ | MHz | MHz | Average | 95th |
| — | 90 | 0 | 59.53 | 63.12 | 1.33 | 2.13 |
| — | 60 | 0 | 57.52 | 59.64 | 1.33 | 2.13 |
| — | 45 | 0 | 54.32 | 55.61 | 1.33 | 2.13 |
| 2.0 | 90 | 0.05 | 60.33 | 65.41 | 1.47 | 2.41 |
| 2.0 | 60 | 0.05 | 59.68 | 63.87 | 1.47 | 2.42 |
| 2.0 | 45 | 0.05 | 57.69 | 60.18 | 1.48 | 2.44 |
| 1.5 | 90 | 0.05 | 60.56 | 66.22 | 1.73 | 3.45 |
| 1.5 | 60 | 0.05 | 60.34 | 65.98 | 1.73 | 3.47 |
| 1.5 | 45 | 0.05 | 59.24 | 63.20 | 1.73 | 3.48 |
| 1.0 | 90 | 0.075 | 60.82 | 67.05 | 2.38 | 5.30 |
| 1.0 | 60 | 0.075 | 60.79 | 67.35 | 2.38 | 5.35 |
| 1.0 | 45 | 0.075 | 60.40 | 66.25 | 2.38 | 5.35 |
| 1.0 | 90 | 0.10 | 60.88 | 67.87 | 2.93 | 6.91 |
| 1.0 | 60 | 0.10 | 60.88 | 68.39 | 2.93 | 6.90 |
| 1.0 | 45 | 0.10 | 60.86 | 68.23 | 2.93 | 6.93 |
| 1.0 | 90 | 0.15 | 61.05 | 70.04 | 4.11 | 10.19 |
| 1.0 | 60 | 0.15 | 61.24 | 70.35 | 4.11 | 10.20 |
| 1.0 | 45 | 0.15 | 61.25 | 70.47 | 4.11 | 10.08 |

In some embodiments, implementation of the STM approach may be particularly advantageous if either the maximum phase change per sample is limited to a practical level like 45° and/or the number of FM DAC bits is less than 10. The limitation on maximum theta is considered below in Table 7.

TABLE 7

Performance Comparison vs Key Parameter Selections with Max Max dθ Limited to 45°

| | | | Sidelobe Spectrum (dBr) | | EVM, % RMS | |
| --- | --- | --- | --- | --- | --- | --- |
| | Max dθ, | | @ 3.5 | @ 8.5 | | |
| $\Lambda_o$ | deg. | λ | MHz | MHz | Average | 95th |
| — | 45 | 0 | 54.32 | 55.61 | 1.33 | 2.13 |
| 2.0 | 45 | 0.05 | 57.69 | 60.18 | 1.48 | 2.44 |
| 2.0 | 45 | 0.075 | 58.83 | 62.18 | 1.62 | 2.94 |
| 2.0 | 45 | 0.10 | 59.63 | 63.92 | 1.80 | 3.81 |
| 2.0 | 45 | 0.15 | 60.56 | 66.82 | 2.24 | 5.50 |
| 1.5 | 45 | 0.05 | 59.24 | 63.20 | 1.73 | 3.48 |
| 1.5 | 45 | 0.075 | 60.36 | 66.18 | 2.11 | 4.89 |
| 1.5 | 45 | 0.10 | 60.80 | 68.15 | 2.55 | 6.38 |
| 1.5 | 45 | 0.15 | 61.10 | 70.19 | 3.51 | 9.47 |

In situations where the number of FM and AM DAC bits is limited to only 8 effective bits, the STM approach leads to spectrum performance that is otherwise completely unattainable without its use, as shown below in Table 8. Under the illustrated conditions, use of the STM approach can provide on the order of 10 dB improved sidelobe level at 8.5 MHz offset at a very acceptable EVM performance level.

TABLE 8

Performance Comparison Versus Key Parameter Selections With Max dθ Limited to 45° and AM & FM DACs Limited to 8 Effective Bits

| | | | Sidelobe Spectrum, - dBr | | EVM, % RMS | |
| --- | --- | --- | --- | --- | --- | --- |
| | Max dθ, | | @ 3.5 | @ 8.5 | | |
| $\Lambda_o$ | deg. | λ | MHz | MHz | Average | 95th |
| — | 45 | 0 | 54.14 | 55.47 | 1.34 | 2.17 |
| 1.5 | 45 | 0.025 | 56.92 | 59.16 | 1.46 | 2.38 |
| 1.5 | 45 | 0.05 | 58.93 | 62.22 | 1.73 | 3.48 |
| 1.5 | 45 | 0.075 | 59.68 | 64.42 | 2.11 | 4.91 |
| 1.5 | 45 | 0.10 | 59.72 | 65.42 | 2.55 | 6.40 |
| 1.5 | 45 | 0.125 | 60.09 | 66.07 | 3.02 | 7.94 |
| 1.5 | 45 | 0.15 | 60.44 | 66.48 | 3.51 | 9.47 |

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

I claim:

1. A method of bandwidth performance enhancement of a solar modulation transmitter comprising:
   detecting entry of a transmit signal into a predetermined region in a signal constellation plane upon which said transmit signal is represented;
   responsive to said detecting, combining a correction signal with the transmit signal to form a combined signal characterized by a combined signal trajectory positioned outside the predetermined region,
   wherein the predetermined region is an annular region about the origin of the transmit signal constellation plane;
   wherein said detecting comprises determining when the transmit signal instantaneous frequency exceeds a preset threshold;
   wherein said determining comprises calculating a phase difference between samples of the transmit signal; comparing the phase difference to a preset value, and; signaling an event detection if the phase difference exceeds the preset value.

2. The method of claim 1 further comprising screening for a predetermined number of sequential event detections, and;
   blocking said signaling of an event detection until the number of sequential event detections exceeds the predetermined number.

3. A method of bandwidth performance enhancement of a solar modulation transmitter comprising:
   detecting entry of a transmit signal into a predetermined region in a signal constellation plane upon which said transmit signal is represented;
   responsive to said detecting, combining a correction signal with the transmit signal to form a combined signal characterized by a combined signal trajectory positioned outside the predetermined region;

wherein said combining comprises scaling the correction signal; time delaying the transmit signal; determining an optimal insertion time, and; adding the scaled correction signal to the time delayed transmit signal at the optimal insertion time.

4. The method of claim 3 wherein said determining an optimal insertion time comprises detecting when the transmit signal instantaneous frequency exceeds a preset threshold.

5. The method of claim 4 wherein said determining an optimal insertion time further comprises determining a phase difference between samples of the transmit signal;

comparing the phase difference to a preset value, and;

signaling an optimal insertion time if the phase difference exceeds the preset value.

6. The method of claim 3 wherein said adding the scaled correction signal to the time delayed transmit signal at the optimal insertion time comprises adding the scaled correction signal to the transmit signal wherein the scaled correction signal is substantially orthogonal to the trajectory of the transmit signal at the optimal insertion time.

7. A system for bandwidth performance enhancement of a polar modulator comprising:

detection circuitry comprising a detection module for detecting entry of a transmit signal into a predetermined region in a signal constellation plane upon which said transmit signal is represented;

a signal correction module for combining a correction signal with the transmit signal to form a combined signal characterized by a combined signal trajectory positioned outside the predetermined region;

wherein the detection module comprises an event detection module; and wherein the event detection module comprises a phase differentiator and a threshold detector, the threshold detector operative to trigger an event detection when the phase differentiator output exceeds a preset threshold.

8. A system for bandwidth performance enhancement of a polar modulator comprising:

detection circuitry comprising a detection module for detecting entry of a transmit signal into a predetermined region in a signal constellation plane upon which said transmit signal is represented;

a signal correction module for combining a correction signal with the transmit signal to form a combined signal characterized by a combined signal trajectory positioned outside the predetermined region wherein the detection module comprises an event detection module and an event screener; and wherein the event screener comprises cascaded unit delay modules and associated logic operative to output a signal when a preset number of unit delayed events have occurred.

9. The system of claim 8 wherein the signal correction module comprises a correction signal generator, a scaling factor generator, a time delay module, and a signal combiner.

10. The system of claim 9 wherein the correction signal generator comprises a unit normal pulse generator, a pulse scaler, and a pulse shaper.

11. The system of claim 9 wherein the scaling factor generator comprises an root mean square (RMS) approximator and a multiplier, the multiplier operative to multiply an RMS approximation of the transmit signal generated by the RMS approximator by a preset scaling factor.

12. The system of claim 9 wherein the time delay module comprises a shift register.

13. The system of claim 9 wherein the signal combiner comprises an adder wherein the adder is operative to combine a time delayed version of the transmit signal with the correction signal.

* * * * *